US007925095B2

(12) United States Patent
Sugiyama et al.

(10) Patent No.: US 7,925,095 B2
(45) Date of Patent: Apr. 12, 2011

(54) PATTERN MATCHING METHOD AND COMPUTER PROGRAM FOR EXECUTING PATTERN MATCHING

(75) Inventors: Akiyuki Sugiyama, Hitachinaka (JP); Hiroyuki Shindo, Hitachinaka (JP); Hitoshi Komuro, Hitachinaka (JP); Takumichi Sutani, Hitachinaka (JP); Hidetoshi Morokuma, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 970 days.

(21) Appl. No.: 11/698,988

(22) Filed: Jan. 29, 2007

(65) Prior Publication Data

US 2008/0037830 A1    Feb. 14, 2008

(30) Foreign Application Priority Data

Mar. 27, 2006  (JP) .................................. 2006-084445

(51) Int. Cl.
*G06K 9/32* (2006.01)
(52) U.S. Cl. ...................................... 382/209; 382/295
(58) Field of Classification Search .................. 382/209, 382/103, 100, 181, 190, 195, 201, 107, 115, 382/124, 295, 276, 293; 250/310, 307, 491.1; 359/326; 356/399, 400; 375/368; 706/15, 706/16, 20
See application file for complete search history.

(56) References Cited

U.S. PATENT DOCUMENTS

| | | | | |
|---|---|---|---|---|
| 5,712,732 A | * | 1/1998 | Street | ........................... 359/630 |
| 6,627,888 B2 | | 9/2003 | Yamaguchi et al. | |
| 6,647,147 B1 | * | 11/2003 | Miyano | ......................... 382/199 |
| 6,671,861 B2 | * | 12/2003 | Noda | ................................ 716/4 |
| 6,888,139 B2 | * | 5/2005 | Tsuneta et al. | ................ 250/311 |
| 7,449,689 B2 | * | 11/2008 | Nagatomo et al. | ............ 250/310 |
| 2003/0173516 A1 | | 9/2003 | Takane et al. | |

FOREIGN PATENT DOCUMENTS

| | | |
|---|---|---|
| JP | 6-231715 | 8/1994 |
| JP | 2001-243906 A | 9/2001 |
| JP | 2002-328015 A | 11/2002 |
| JP | 2005-331495 | 12/2005 |

OTHER PUBLICATIONS

Japanese Office Action issued in Japanese Patent Application No. JP 2006-084445, dated Feb. 1, 2011.

* cited by examiner

*Primary Examiner* — Sheela C Chawan
(74) *Attorney, Agent, or Firm* — McDermott Will & Emery LLP (57) ABSTRACT

A pattern matching method which is capable of selecting a suitable measurement object pattern, even on a sample containing a periodic structure, and a computer program for making a computer execute the pattern matching. In a pattern matching method which executes matching between the design data-based first image of an object sample, and a second image, whether or not a periodic structure is included in a region to execute the matching is determined, so as to select a pattern, based on distance between an original point which is set in said image, and the pattern configuring said periodic structure, in the case where the periodic structure is included in said region, and to select a pattern based on coincidence of the pattern in said image, in the case where the periodic structure is not included in said region, and a computer program product.

15 Claims, 9 Drawing Sheets

FIG. 3E $$M(p,q) = \sum_{(i,j) \in S} i^p j^q$$

PATTERN MATCHING METHOD AND COMPUTER PROGRAM FOR EXECUTING PATTERN MATCHING

BACKGROUND OF THE INVENTION

The invention relates to a pattern matching method and a computer program for executing the pattern matching, and in particular, relates to a method suitable to execute pattern matching of a sample containing a periodic structure, and the program.

For example, in a scanning electron microscope (SEM) or the like, which measures and inspects a semiconductor wafer, position checking of a field of view (FOV) or a scanning position to a desired measurement position is carried out, by using pattern matching technique. JP-A-2001-243906 (corresponding U.S. Pat. No. 6,627,888) explains an example of such a pattern matching method.

A pattern matching is carried out by measurement of coincidence between a pattern image, which is called a template and registered in advance, and an image obtained actually by SEM or the like. JP-A-2002-328015 (corresponding USP: US2003/0173516) explains an example of forming a template for pattern matching, based on the design data of a semiconductor element or the like. Formation of the template based on the design data has an advantage in that bothering to obtain an SEM image or the like can be eliminated.

A general pattern matching method, in an image, selects a position with the highest coincidence with a template as a position for movement of a field of view or a measurement object. However, in the case of a pattern where a plurality of equivalent shapes is periodically arranged, pattern selection based on coincidence may unnecessarily largely move a field of view. In the case of a periodic structure, because the same patterns are arranged, average evaluation of these patterns may be allowed by selecting any pattern, in the case where the evaluation is carried out by extraction of one pattern. However, selection of a pattern based on coincidence results in selection of a pattern with the highest coincidence, therefore, there is a possibility for a pattern at a position far from the center of a field of view before pattern matching to be selected.

It is considered to move a field of view by movement of a stage where a sample is arranged, or by deflecting electron beams of SEM so as to move a field of view of SEM, however, unnecessarily large movement of a field of view may increase error components included in a stage or a deflector or the like, and cause erroneous movement of a field of view. Pattern matching methods explained in Patent Documents 1 and 2 are not directed to solve these problems.

SUMMARY OF THE INVENTION

It is an object of the invention to provide a pattern matching method, which is capable of selecting a suitable measurement object pattern, even on a sample containing a periodic structure, and a computer program for making a computer execute the pattern matching.

To attain the above object, according to one aspect of the invention, in a pattern matching method which executes matching between first image and a second image based on the design data of an object sample, whether or not a periodic structure is included in a region to carry out the matching, is determined; and, based on distance between an original point which is set in the image, and the pattern configuring the periodic structure, in the case where the periodic structure is included in the region; and based on coincidence of the pattern in the image, in the case where the periodic structure is not included in the region; the pattern matching method to select a pattern and a computer program are provided.

The above configuration is capable of, in the case where a matching region contains a periodic structure, selecting a pattern in preference to distance from an original point, so as not to unnecessarily largely move a field of view, and in the case where a periodic structure is not contained, selecting a pattern in preference to a coincidence, from a viewpoint of no occurrence of the above problem. As described above, in accordance with one aspect of the invention, it is possible to execute a suitable matching in response to a sample state.

According to a further specific aspect of the invention, correct determination can be provided without being influenced by a noise or production errors of a sample, because presence or absence of a periodic structure is determined based on the design data.

According to one aspect of the invention as above-described, application of a suitable pattern matching method becomes possible depending on containing or not containing a periodic structure in a sample, and thus a correct pattern matching (position checking) can be carried out, irrespective of containing or not containing a periodic structure in a sample.

Other objects, features and advantages of the invention will become apparent from the following description of the embodiments of the invention taken in conjunction with the accompanying drawings.

DESCRIPTION OF THE EMBODIMENT

Explanation below relates to a method for executing a pattern matching based on a structure mainly on a semiconductor wafer, a semiconductor exposure mask and liquid crystal; a computer program for executing the pattern matching; and an apparatus for executing the computer program.

An inspection object of a critical dimension scanning electron microscope, which is a kind of a semiconductor inspection apparatus, is a pattern formed on a semiconductor wafer in production of a semiconductor chip. Analysis of a structure of a semiconductor chip, using a critical dimension scanning electron microscope, requires position checking by image processing, to automatically and continuously execute the inspection. Thus it requires setting of imaging condition, or position checking condition by image processing, inspection condition including inspection items or the like, before executing automatically and continuously inspection.

Position checking by image processing is called pattern matching. Pattern matching requires a registration, in advance, of a pattern having a characteristic shape, in addition to an inspection object, to automatically search an inspection position. As this registered pattern, an image obtained by imaging an inspection object by a critical dimension electron microscope image, contour line information calculated from an image obtained by imaging, an image of the designed pattern like a CAD data or the like, contour line information of the designed pattern or the like is used. Position checking is carried out using this registered pattern to execute pattern matching for a pattern to be inspected, which is an image obtained by imaging every time of inspection.

A critical dimension scanning electron microscope (CD-SEM) executes position checking by pattern matching using the registered pattern, and position checking of an inspection position from positions of the result of pattern matching. In this case, precise position checking for imaging an inspection object is carried out, by executing pattern matching with raising stepwise imaging magnification from low magnification for imaging an image of an inspection object in wide range, to high magnification for executing precise position checking. After specification of the inspection position, a critical dimension scanning electron microscope executes inspection based on inspection items, which were preset. Representative examples as inspection items of a critical dimension scanning electron microscope include line width, hole size or the like formed on a semiconductor wafer.

Deformation of a pattern to be detected from a shape registered as the registered pattern, in the case of execution of position checking by pattern matching, may incur failure in pattern matching, which results in providing inspection position different from objective position, and failure in inspection; thus causing a problem on efficient operation of an inspection apparatus.

In addition, a critical dimension scanning electron microscope requires to be engaged by an experienced operator for setting work of inspection conditions, as well as setting of registered patterns by dividing imaging magnifications into several steps to execute position checking for a microscopic inspection object, and so on, which increases work load of an operator, and thus causes a problem of difficulty in efficient setting of inspection conditions. In addition, in production of a system LSI, low-volume diversified production is usual in many cases, which increases setting frequency of inspection conditions, thus causing a problem on efficient operation of an inspection apparatus.

A method for solving these problems include a method for shortening a period occupied by a critical dimension scanning electron microscope for setting inspection conditions, by utilization of the design data like a CAD data or the like, to set inspection conditions, so as to improve operation rate of an critical dimension scanning electron microscope, however, in pattern matching using the design data and an electron microscope image obtained by imaging a semiconductor wafer as a pattern to be inspected, a problem of shape deformation of the pattern on the semiconductor wafer makes precise position checking difficult.

In addition, in simulation for determination of exposure conditions in preparation of a semiconductor circuit, position checking between a light intensity image obtainable by exposure simulation and an electron microscope image, and setting of suitable threshold value of the light intensity image are important, so as to determine exposure conditions and also to set conditions which is capable of simulation with higher precision. However, difference in shapes between the light intensity image and the electron microscope image makes difficult the precise position checking and setting of the suitable threshold value.

A method for solving this problem includes a pattern matching method using an electron microscope image, and a center of gravity distribution image prepared from the design data corresponding to a imaging region, or the light intensity image, however, because an inspection object to be imaged by a critical dimension scanning electron microscope has a pattern with a circuit structure called a gate or a capacitor arranged in periodical manner, in many cases, the case where pattern matching is carried out, using an electron microscope image obtained by imaging at a local position, may make periodical deformation from a correct position, and thus may result in failure.

In addition, a critical dimension scanning electron microscope has characteristics of higher resolution in a main scanning direction (a line direction of scanning line of electron beams) of an electron microscope. This is caused by physical characteristic in irradiation of electron beams onto an inspection object. Because of this characteristic, an image is obtained by imaging with rotating in the most suitable scanning direction to inspect an inspection object. In this case, an image obtained by imaging becomes a rotated image against a physical direction of an inspection object. In this case, a rotated image is displayed also on a display, which therefore has a defect that an operator easily takes a wrong direction. In addition, also, in a system for checking the design data, because an operator understands a position based on the design data, rotation of an electron microscope image against a physical direction or the design data easily provides a wrong position to an operator, as well.

In addition, imaging may be carried out under different scanning ratio in a vertical direction and in a horizontal direction, aiming at inspecting a critical dimension scanning electron microscope itself. For example, wider range of imaging may be carried out in a vertical sub scanning direction, relative to a horizontal main scanning direction. In this case, a region irradiated with electron beams onto an inspection object provides a rectangular shape longer in the vertical direction, while an electron microscope image to be imaged becomes a square shape. This case provides a square shape on a display, and thus has a defect that an operator may easily misunderstand a physical shape. In addition, also, in a system for checking the design data, an operator, in many cases, understands a shape based on the correctly design data in view of vertical to horizontal ratio, and thus generates a defect that an operator easily misunderstands the shape.

A pattern matching method by image processing of a critical dimension scanning electron microscope, as will be explained below, is one to notice and solve a problem that pattern matching at a periodically displaced position results in failure of position checking and cannot provide correct position checking, in the case where the registered pattern and an inspection object have a periodic structure.

An embodiment of the invention, which will be explained below, is one for making possible pattern matching to reduce the periodical displacement between the registered pattern and the inspection object, even in the case where measurement and inspection object has a periodic structure.

In addition, an embodiment will also be explained that is capable of displaying on a display so as to provide easy understanding by an operator, in the case where an image was obtained by rotation of an imaging direction against a physical position of an inspection object or a display of the design data.

In addition, an embodiment will also be explained that is capable of displaying on a display so as to provide easy understanding by an operator, in the case where an image was obtained by changing imaging ratio against a physical vertical and horizontal ratio of an inspection object, or vertical and horizontal ratio of the design data.

Specifically, selection of kinds or parameters of pattern matching, based on the design data (registered pattern) or kinds of measurement and inspection object or both, is made possible.

Furthermore, counting of the number of structure in an image of the registered pattern, an inspection object or both is made possible. In addition, selection of kinds or parameters of pattern matching based on the number of structure is made possible.

In addition, determination of whether or not structure in an image of the registered pattern, the inspection object or both is periodically arranged is made possible. In addition, an embodiment which makes possible selection of kinds or parameters of pattern matching based on the periodicity of a structure will be explained. In addition, an embodiment which specifically makes possible digitization based on apex number, length, area, inclination, degree of circularity and/or moment of each drawing of a structure present in an image of the registered pattern, the inspection object or both, to determine shape characteristics of each drawing based on any of these numerical values or a combination of a plurality of these numerical values, to determine whether or not drawings in the image are the same, and to determine whether or not the image is periodical based on these drawings, will be explained.

Furthermore, in the case where structure in an image of the registered pattern, the inspection object or both is periodically arranged, and where a plurality of solutions are obtained as a result of pattern matching by image processing such as a normalized correlation method or a generalized Hough transformation method, an embodiment which makes possible selecting a solution of a position suitable to an application object from a plurality of solutions will be explained.

In addition, an embodiment, which makes possible changing kinds or parameters of pattern matching, based on pattern density in imaging range or in an image will be explained.

Furthermore, in the case where a rotated image against a physical direction of an inspection object, or a rotated image against the design data displayed on a display is imaged, an embodiment which makes possible a display easy to understand a direction, so as to make an operator difficult to misunderstand a direction will be explained.

In addition, in the case where imaging is made under different physical vertical to horizontal ratio of the inspection object, or different vertical to horizontal ratio against the design data displayed on a display, an embodiment which makes possible for an operator to understand a correct shape in view of vertical to horizontal ratio will be explained.

Figure 1:
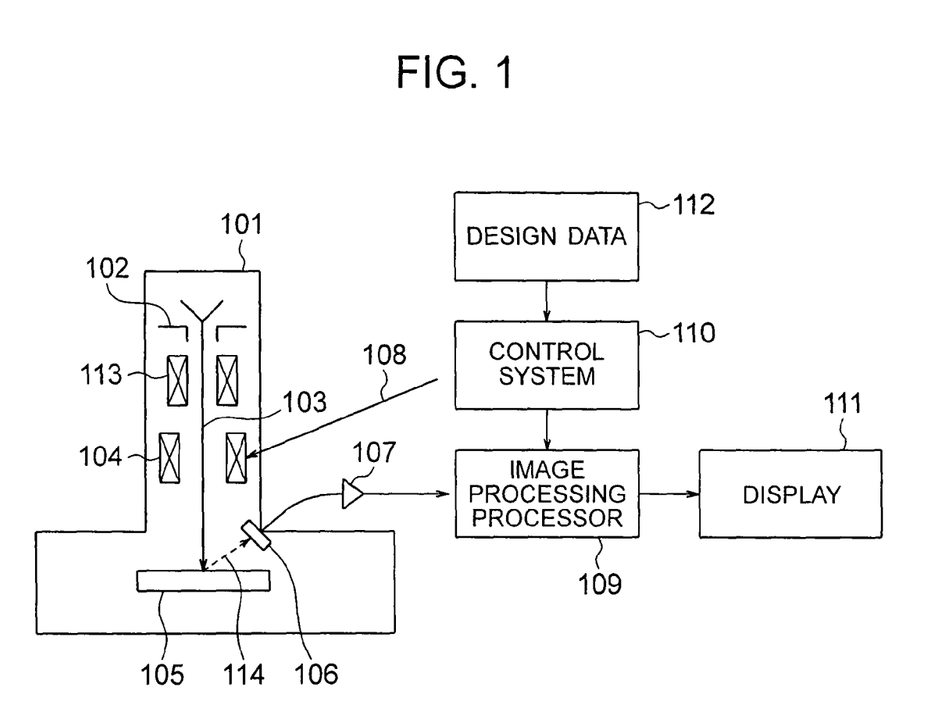
FIG. 1 is a block diagram of a schematic configuration of a critical dimension scanning electron microscope.

FIG. 1 is a block diagram of a schematic configuration of a critical dimension scanning electron microscope. The electron beams 103 emitted from the electron gun 102 in the electron microscope 102 are converged by the electron lens 113, and irradiated onto the sample 105. Intensity of the secondary electrons 114 or reflection electrons generating from the surface of the sample 105 by irradiation of electron beams is detected by the electron detecting unit 106, and amplified by the amplifying unit 107. The electron beams 103 are raster scanned on the surface of the sample 105 by the polarizing unit 104, which moves an irradiation position of the electron beams 103 according to the control signal 108 of the control system 110. A signal output from the amplifying unit 107 is subjected to AD transformation in the image processing processor 109 to create a digital image data. The display 111 is an apparatus, which displays an image data. In the design data 112 of a semiconductor chip like a CAD data or the like, a region to be inspected can be specified in an arbitrary manner. The control system 110 executes control for imaging or inspection of a semiconductor wafer, or communication to the image processing processor 109, using information of the design data 112 and a region to be inspected. A system configured by the electron microscope 101, the image processing processor 109, the control system 110, the display 111 and a storing apparatus of the design data 112 has a communication unit for data exchange.

The image processing processor 109 executes pattern matching between the design data and the image obtained, based on a program registered in the control system 110 or the image processing processor 109. In addition, as for matching processing, various methods are considered as will be described below. Also, the program is programmed so as to make possible a flow chart shown in FIG. 2, image processing and calculation to be described later.

In addition, the program is capable of being distributed as a readable medium by a computer, and is applicable without reference to a specified type of a medium used for a practical distribution. An example of such a readable medium by a computer includes a recordable type medium such as a flexible disk, a CD-ROM or the like, along with a transmittable type medium like digital and analog communication links or the like.

Figure 2:
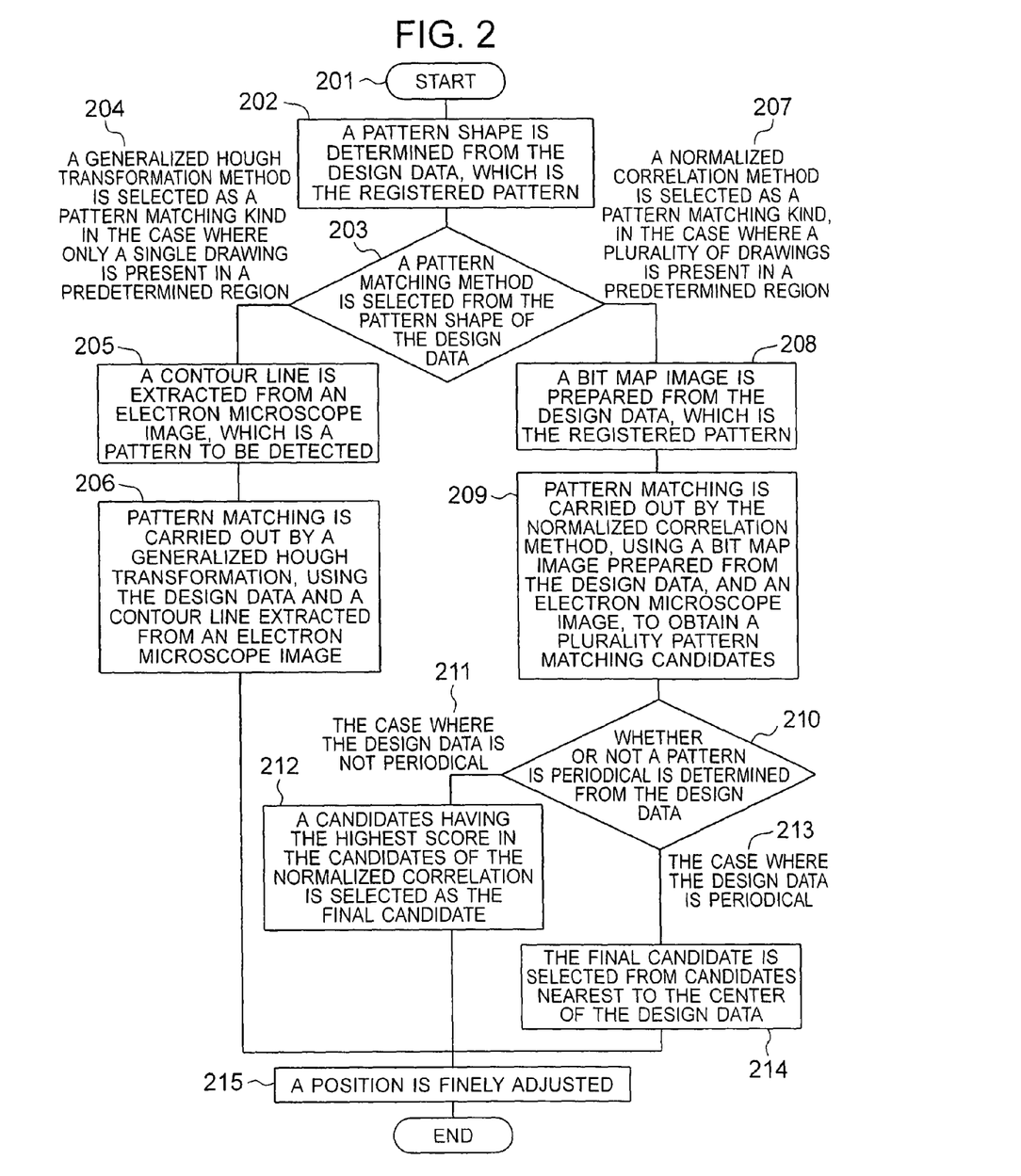
FIG. 2 is a flowchart of pattern matching of the design data and an electron microscope image, according to one embodiment of the invention.

FIG. 2 shows the flowchart 201 of pattern matching processing between an image obtained by imaging using a critical dimension scanning electron microscope, and the design data, according to one embodiment of the invention. The design data here represents a CAD data or the like, in designing LSI prepared by a semiconductor, a semiconductor exposure mask or liquid crystal or the like, and includes any information indicating an exterior structure irrespective of a vector image by the coordinate data or a bit map. First of all, a pattern shape is determined from the design data in 202. The pattern shape determination can be carried out, for example, by the methods shown in FIGS. 3A, 3B, 3C, 3D and 3E, and FIGS. 4A, 4B, 4C and 4D along with FIGS. 5A and 5B.

As will be explained below, in executing pattern matching between the design data-based first image and the SEM-based second image, kinds of pattern shapes included in an object region to be compared are determined, and in response to the determination, a pattern matching method is changed. In addition, in the explanation below, an example on the case where kinds of patterns in an object region to be matched is determined based on the design data which is registered will be explained, however, there is no limitation thereto, for example, the determination may be carried out in response to a pattern state at the surrounding area to be matched on the design data. The design data represents an ideal shape without a noise or a production error of a sample, therefore, kinds of pattern can correctly be determined without affected by such an error factor.

After determination of a pattern shape, a pattern matching method is changed depending of the pattern shape, in 203. In the case where a single drawing is present in a pattern of the design data, as in 204, a generalized Hough transformation is selected as an algorism for pattern matching. The generalized Hough transformation is a general method as a pattern matching method, and a method for position checking by calculation, called voting, of an exterior shape line or pixel coordinates of the registered pattern and a pattern to be detected. In this case, pattern matching by a generalized Hough transformation is carried out in 206, to detect candidates of pattern matching, after extraction of a contour line from an electron microscope image, which is a pattern to be detected, in 205.

Figure 6A:
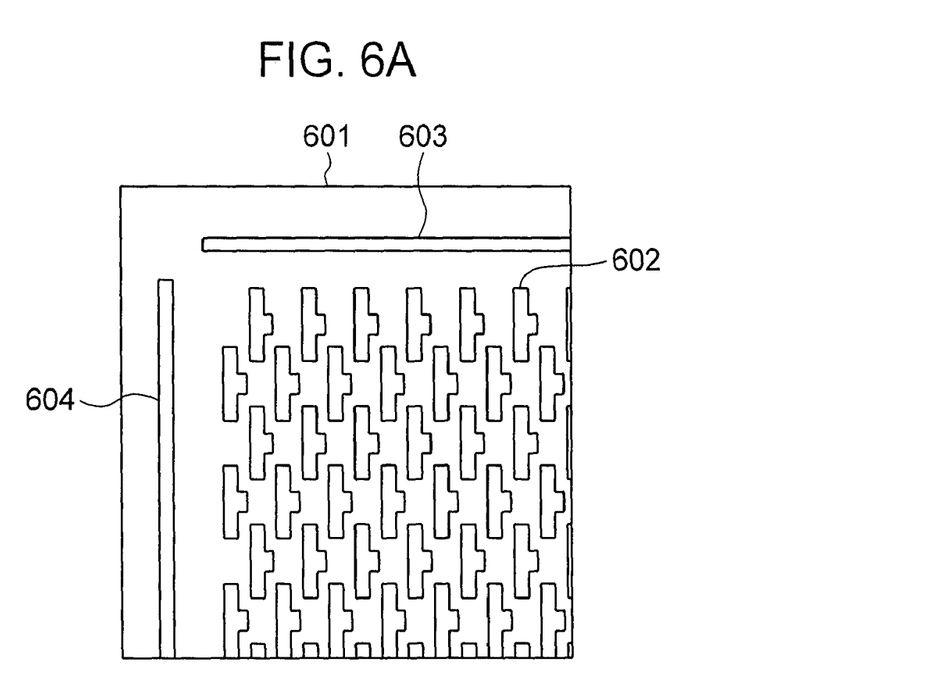
FIGS. 6A and 6B are drawings which show a method for selecting a method of pattern matching and a characteristic drawing from patterns, according to one embodiment of the invention.
Figure 6B:
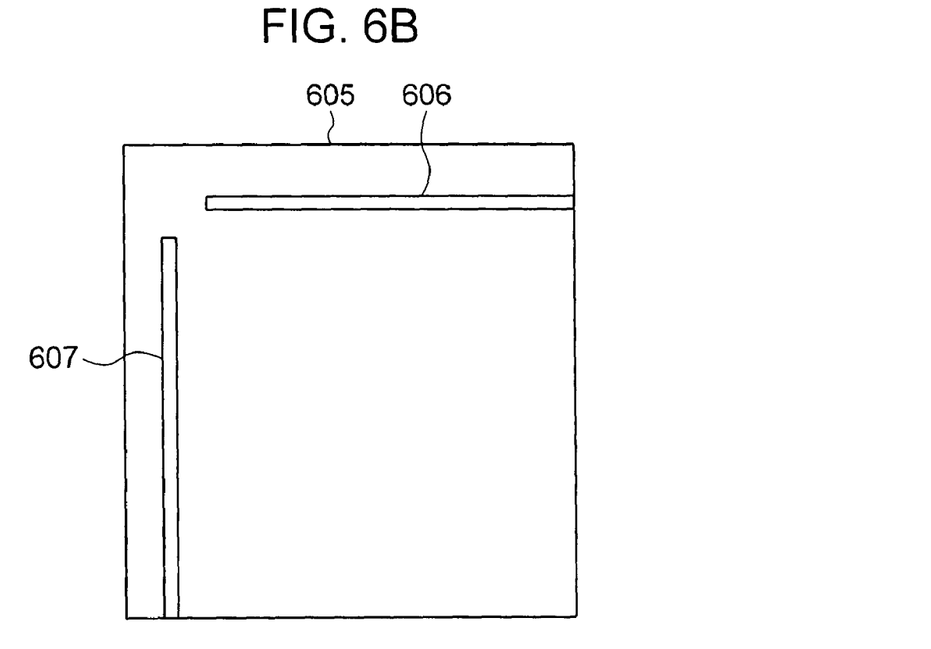

Selection of a generalized Hough transformation, in the case where a single drawing is present in a pattern, is advantageous in view of less calculation load than a normalized correlation method, which requires calculation for many pixels. In addition, it is more advantageous than a normalized correlation method, also in the case where pattern matching is carried out by extraction of only a characteristic drawing from a predetermined region, as shown in FIGS. 6A and 6B. In addition, a generalized Hough transformation in 206 is capable of detecting a plurality of candidates of pattern matching, however, one with the highest score is selected.

On the other hand, in the case where a plurality of drawings are present in the design data, a normalized correlation method is selected, in 203, as algorism for pattern matching as in 207. A normalized correlation method is a well-known method in pattern matching by image processing, which executes pattern matching using a bit map image in the registered pattern and a pattern to be detected. This is a robust general method for an arbitrary image, however, because of calculation to check all of the pixels in a predetermined region, a large quantity of calculation load and processing time are required. In addition, in the case where execution of pattern matching is desired by extraction of only a characteristic drawing from the registered pattern or a predetermined region of a pattern to be detected, as a method shown in FIG. 6, the normalized correlation method has a defect that detection capability is reduced when other drawing is present in any of the patterns. In the case where pattern matching is carried out by a normalized correlation method, a bit map image is prepared from the design data, in 208, and pattern matching is carried out by an electron microscope image and a normalized correlation method, in 209. A normalized correlation method is, in general, capable of detecting a plurality of pattern matching candidates in the order of higher score.

After detection of a plurality of pattern matching candidates in the normalized correlation method, whether or not a pattern of the design data is periodical is determined, in 210; in the case where the design data is not periodical as in 211, pattern matching candidates having the highest score (having the largest coincidence) of a normalized correlation method are selected from a plurality of pattern matching candidates, in 212. In addition, in the case where pattern of the design data is periodical as in 213, pattern matching candidates are selected from a plurality of pattern matching candidates, by the method of FIGS. 7A and 7B.

For pattern matching candidates detected in 206 or 212 or 214, fine adjustment on a position is carried out in 215. This is a fine correction because of difference in shape or size by each drawing between the design data and an electron microscope image, which results in no coincidence of the center or center of gravity in each of the drawings, and thus makes an objective inspection impossible, in many cases. In this method, an automatic execution method by image processing by obtaining an exterior line from the design data and the electron microscope image, or the like is adopted. The center of gravity of each of the drawings is checked to output the final pattern matching candidate, by 206. The pattern matching between the design data and an electron microscope image by a method of the flowchart 201 provides high success rate or little displacement by a periodical pattern; in addition, a precise automatic pattern matching becomes possible, where center of gravity coincides by each drawing.

FIGS. 3A, 3B, 3C, 3D and 3E are drawings which show a method for determination of a pattern shape based on the design data, determination of pattern is from design data, according to one embodiment of the invention. The design data 301 is identified by each of the drawings. For example, 302, 303, 304, 305 and 306 are structurally separated drawings. In the case where the design data is a vector image based on coordinates, separation processing of drawings is easy because of being coordinate processing. As a result, the design data 301 can determine whether or not it contains a single drawing or a plurality of drawings. In the case of the drawing 301, a plurality of drawings is included. The drawing 307 is extracted to execute calculation processing of characteristic amounts against 302. Determination of the coordinate number and the peripheral length of 307 is easy, because of executing only a simple coordination calculation. After that, to determine the area of 307, 307 is divided into triangles as shown in 308. 309 is an arbitrary point in the structure of 308, and by drawing lines to each of the apexes, division to triangles is possible as shown in 308. Areas of the triangles can easily be calculated by coordinate calculations, and by summing up it, the area of 307 can be determined. A rectangle shown by hatching of 310 is a circumscribed rectangle of 307. The inclination 312 of this diagonal line 311 can be calculated as inclination, which is the characteristic value of 307. In addition, to determine the moment and the center of gravity of 307, the vertical axis I314 and the horizontal axis J315 are provided. In this case, 307 is divided by the arbitrary small block 316.

This block can be set as appropriate, as long as it is capable of representing the shape of 307. In this case, a quantization error generates depending on the size of 316. To determine the moment, the numerical equation 317 is utilized. 318 obtained by substitution of 317 is a moment in the direction of the vertical axis I (314), and 319 is a moment in the direction of the horizontal axis J (315). In addition, 320 and 321 obtained by utilization of 317 are numeral equations to determine center of gravities, and 320 is a coordinate in a direction of the I axis (314), and 321 is a coordinate in a direction of the J axis (315).

Figure 3A:
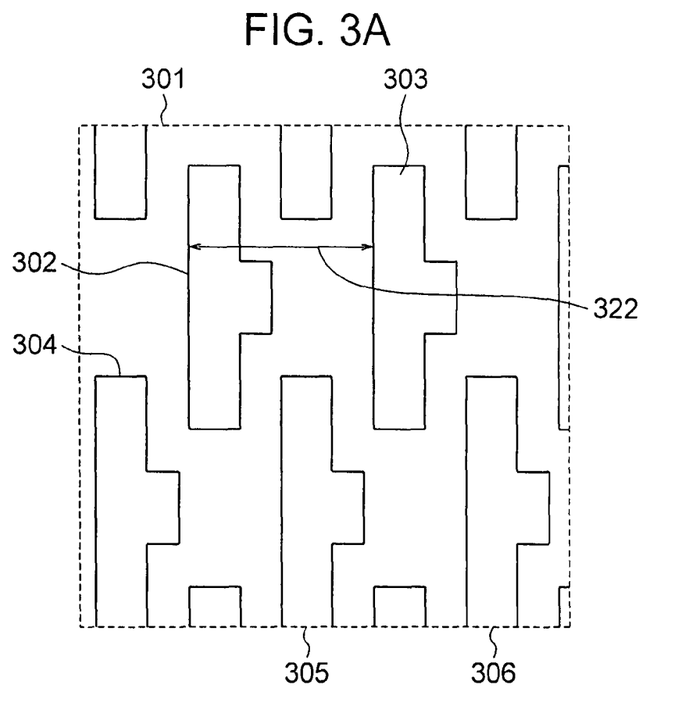
FIGS. 3A, 3B, 3C, 3D and 3E are drawings which show a method for determination of a pattern shape, based on the design data, according to one embodiment of the invention.
Figure 3B:
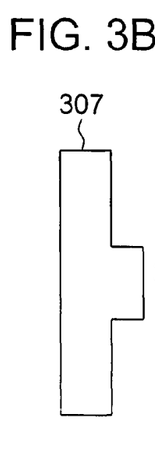
Figure 3C:
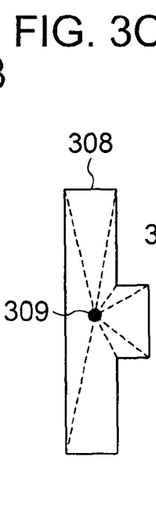
Figure 3D:
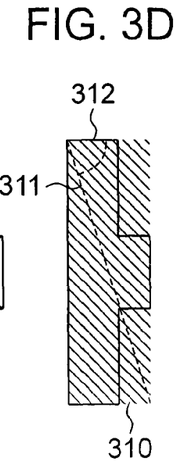
Figure 3E:
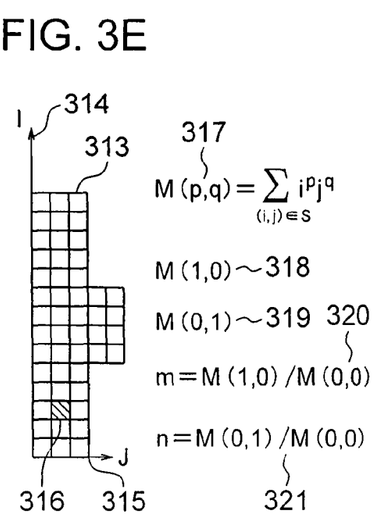
Figure 4A:
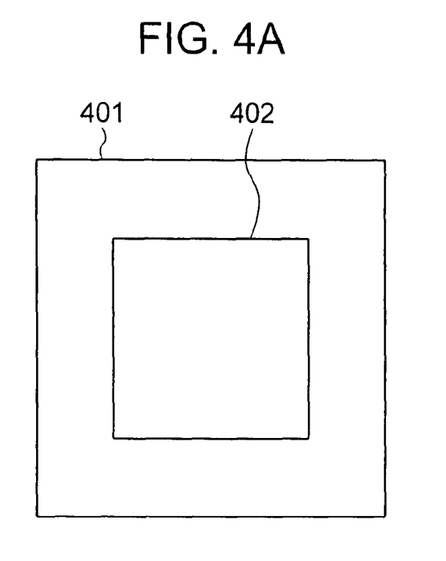
FIGS. 4A, 4B, 4C and 4D are drawings which show a method for registering a specified combination of the design data and an electron microscope image, according to one embodiment of the invention.
Figure 4B:
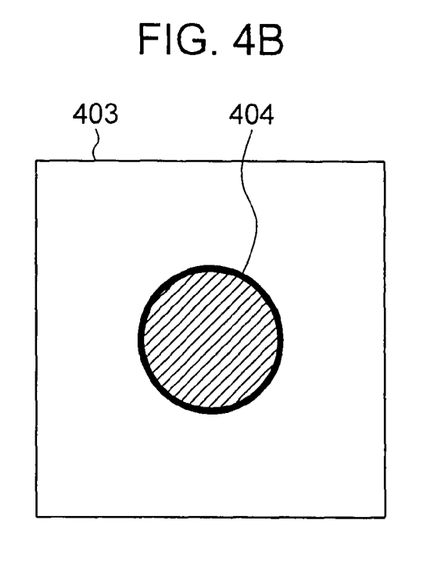
Figure 4C:
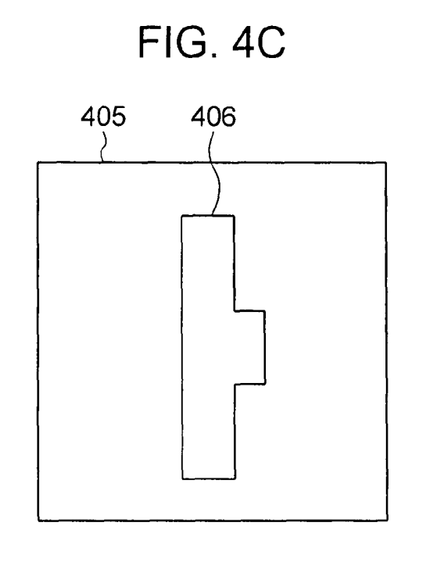
Figure 4D:
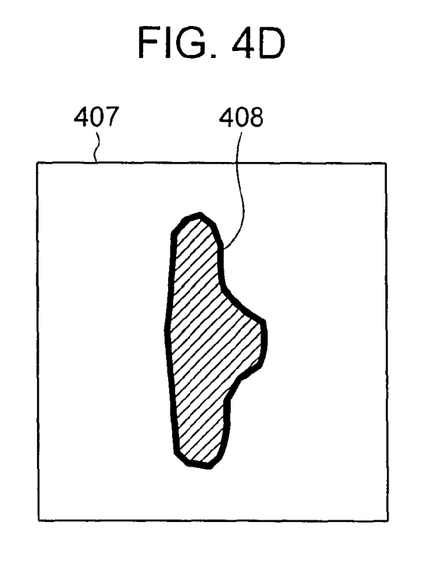

In addition, other than 302, similarly for 303, 304, 305 and 306, processing to calculate characteristic values is carried out. The results show that 302, 303, 304, 305 and 306 each has the same characteristic values on apex number, peripheral length, area, inclination, degree of circularity, moment and center of gravity. Therefore, 302, 303, 304, 305 and 306 can be determined to be the same drawings. As a result, the design data 301 can be determined to be a periodic pattern containing a plurality of the same drawings.

In this case, all of the characteristic values are not necessarily determined, and an object processing can also be carried out also by calculating only single characteristic value or a combination of a plurality of the characteristic values enough to determine to be the same drawings. In addition, each of the characteristic values is not necessarily the same, and an error range can be set.

In addition, because each of the drawings has known coordinates, arrangement of each of the drawings in the design data 301 can easily be calculated, for example, the distance 322 between 302 and 303 can also be obtained.

In addition, in the case, contrariwise, where a drawing having not the same characteristic value is present, it can be determined that the drawing is specific against other drawings, and there is no periodicity at the position of the specific drawing.

In the case where the design data is a vector image based on the coordinates, these calculations become easy due to being coordinate processing, and also in a bit map image, similar processing is possible because preparation of a vector image from the bit map image is easy. In addition, as an example here, a method for calculation of characteristic values of a drawing is applied to a vector image, however, a method for direct calculation of each characteristic values from a bit map image is known as a tool for image processing, therefore objective calculation is possible from any of the images.

In addition, in the flowchart 201 in FIG. 2, a pattern shape of 202 was determined based on the design data, however, because a vector image can be obtained also from an electron microscope image by execution of contour line extraction processing, it is possible to execute processing of FIG. 3, or execute objective processing by an electron microscope image instead of the design data, in processing of 202, in this case, a processing equivalent to that intended by the invention is provided.

In addition, FIGS. 4A, 4B, 4C and 4D are drawings which show a method for selecting a pattern matching method by particularly specifying a shape of each drawing, according to one embodiment of the invention. For example, in the case where design is made by a square shape as in 402 in the design data 401, imaging of actually prepared structure on a semiconductor, on the electron microscope image 403, provides a circular form as shown by 404, in many cases. In this way, in the case where a square shape is present in the design data, object in many cases is to find out a circular form in an electron microscope image. In addition, pattern matching by image processing may select a method specified to a specified shape, and may also adopt a method advantageous to a specified shape. This adoption may be specified by manual operation, however, it is also possible by branching at 203 so as to select a pattern matching method to detect a circular form, in the case where a drawing is a square form, in case of a processing of 202. In addition, not only to a circular form but also to an arbitrary shape as the structure 406 in the design data 405, a pattern matching method can also be selected, in the case where a corresponding shape is predicted in advance, as the structure 408 in the electron microscope image 407.

Figure 5A:
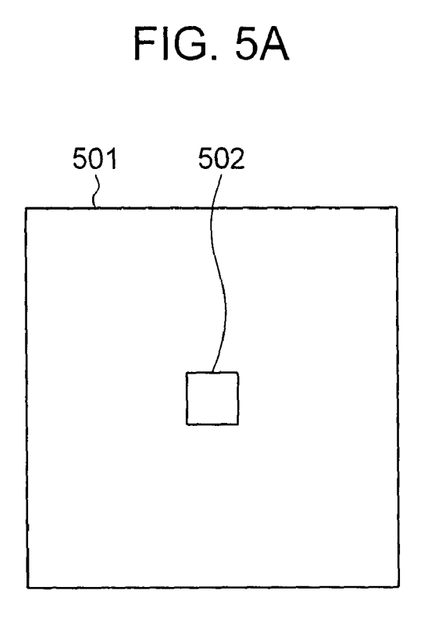
FIGS. 5A and 5B are drawings which show a method for determination of whether or not a single drawing or a plurality of drawings are included in a pattern, according to one embodiment of the invention.
Figure 5B:
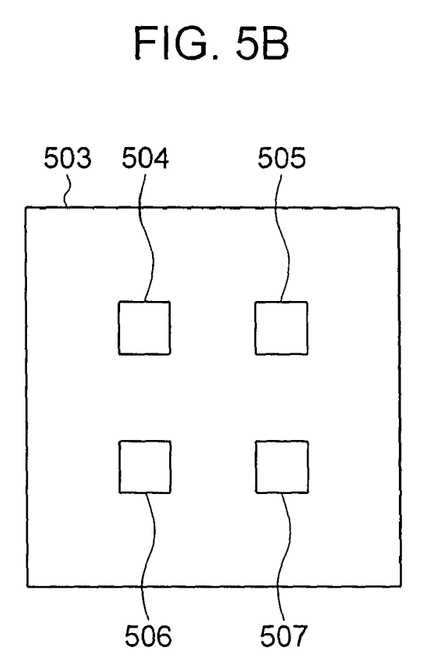

FIGS. 5A and 5B are examples of determination of whether or not a pattern includes a single drawing or a plurality of drawings, according to one embodiment of the invention. The design data 501 is an image configured by a single drawing, because of containing only the drawing 502; the design data 503 is an image configured by a plurality of drawings, because of containing the drawings 504, 505, 506 and 507. This is easily determined by processing shown in FIG. 3.

FIGS. 6A and 6B are drawings which show processing for selecting a drawing suitable to pattern matching, after execution of extraction processing of a characteristic pattern, according to one embodiment of the invention. The design data 601 can be determined, by a method shown by FIG. 3, to contain a plurality of the same drawings as the shape of 602, and also each one drawing 603 and drawing 604. In executing pattern matching, it is desirable that the registered pattern or a pattern to be detected is a specific shape compared with other region. Therefore, the case where pattern matching contains many drawings 602, which present in multiple in the design data 601, has a defect of easy generation of displacement in periodicity in pattern matching due to absence of specificity in a shape, and thus not suitable. On the other hand, the drawing 603 and the drawing 604 are specific, which present one by one in the design data, therefore suitable in execution of pattern matching. In addition, as was referred to in FIG. 2, it is possible to execute pattern matching by a generalized Hough transformation method by extraction of only a characteristic drawing from a predetermined region of the registered pattern or the pattern to be detected. In this way, it is possible to select a method for matching depending on a pattern shape, or select a drawing suitable to pattern matching. Explanation was made on a generalized Hough transformation method as an example; however, the invention should not lose any generality to a combination between a specified pattern matching method and a drawing having a characteristic shape suitable to the method.

Figure 7A:
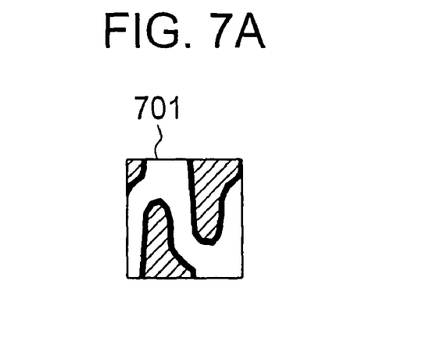
FIGS. 7A and 7B are drawings which show a method for selecting a position nearest to a specified position from periodic patterns, according to one embodiment of the invention.
Figure 7B:
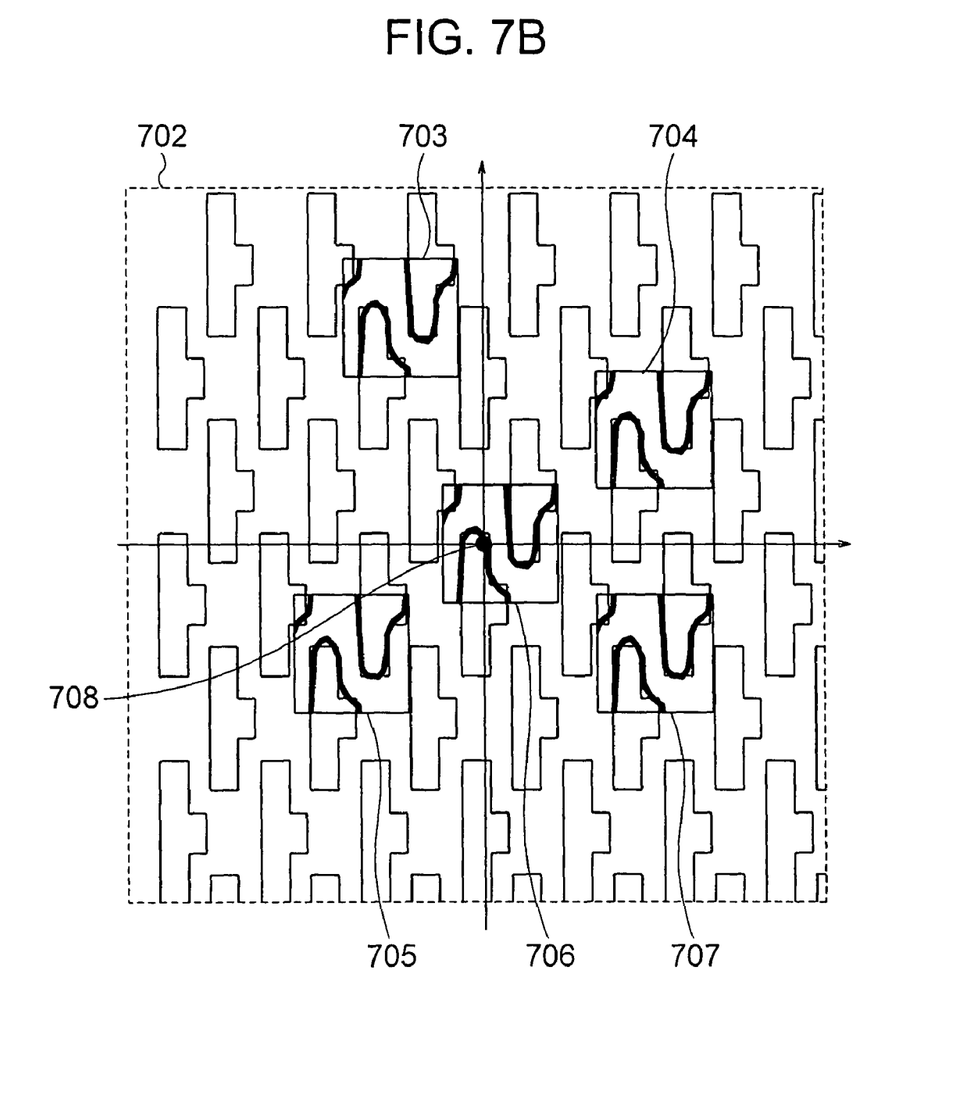

FIGS. 7A and 7B are drawings showing a method for selecting a solution suitable to an application, among a plurality of solutions, in the case where the registered pattern, or the pattern to be detected or both is periodical, and where a plurality of solutions are obtained as a result of pattern matching by such as a normalized correlation method or a generalized Hough transformation.

In the case of finding out a position corresponding to the electron microscope image 701, from the design data 702, execution of pattern matching using a normalized correlation method or a normalized correlation method detects a plurality of solutions, for example, 703, 704, 705, 706 and 708, because a plurality of shapes similar to the electron microscope image 701 are present in the design data 702. In this case, selection of a solution near to the center of a field of view, in inspection items of a critical dimension scanning electron mirror, is suitable to the inspection. By setting the original point 708 at the center of a field of view, distance to the center coordinates of each of the solutions 703, 704, 705, 706 and 708 are determined. These distances can simply be calculated by mathematical calculation. The final solution is output as 706, because a solution with the shortest distance is 706. In this way, in the case where a pattern is periodical, and where a plurality of solutions are obtained as a result of pattern matching using such as a normalized correlation method or a generalized Hough transformation, a suitable solution can be selected among a plurality of optimal solutions, by setting position coordinates in response to an application.

Figures 8A, 8B:
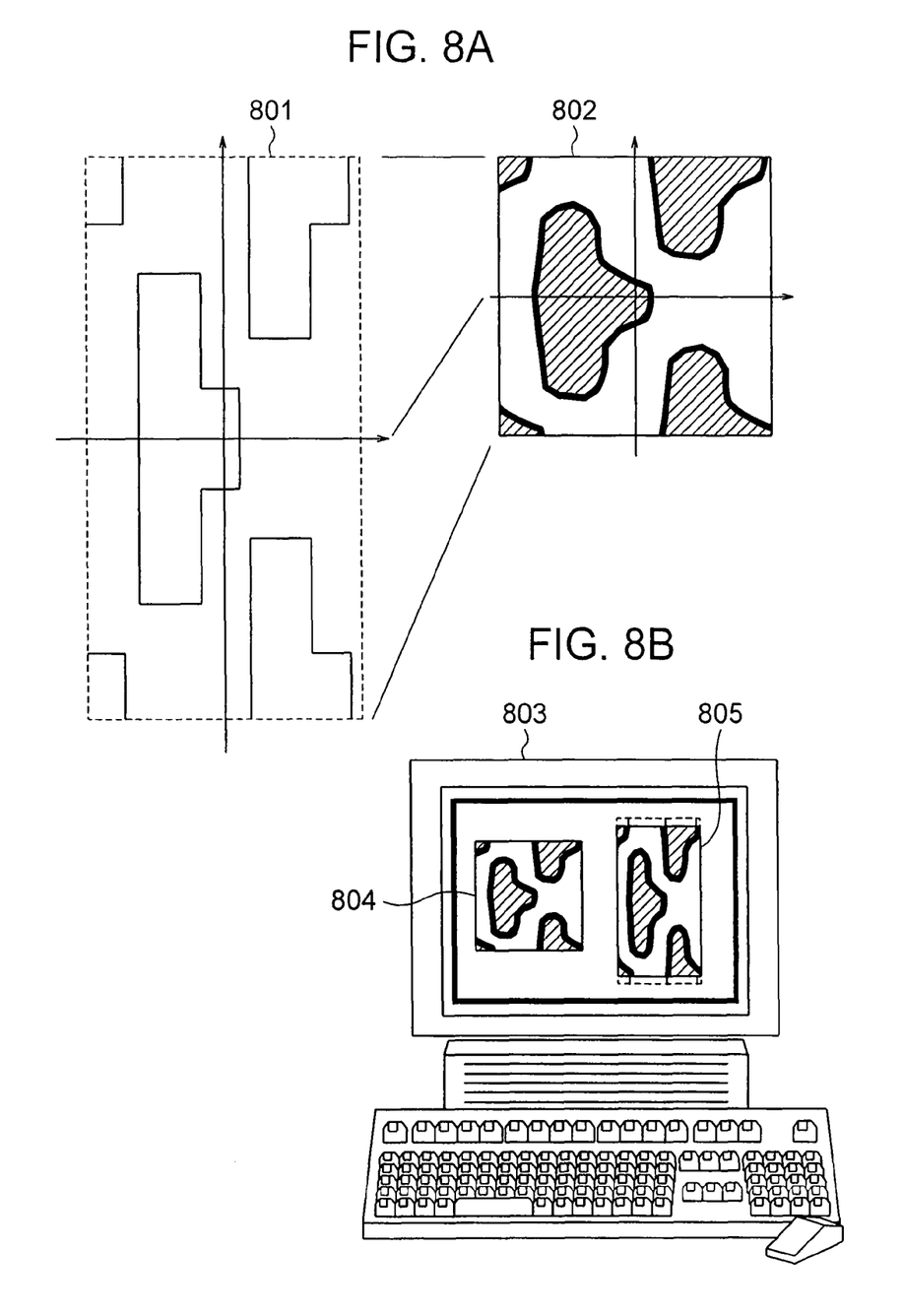
FIGS. 8A and 8B are drawings which show a method for displaying the design data and an electron microscope image on a display, according to one embodiment of the invention.

FIGS. 8A and 8B are drawings which show a method for displaying on the display 803, according to one embodiment of the invention, in the case of executing pattern matching by imaging under different physical vertical to horizontal ratio of an object to be inspected, or vertical to horizontal ratio against the design data displayed on the display. It is possible to execute a pattern matching method, in the case where imaging is carried out by changing physical vertical to horizontal ratio of an object to be inspected, or vertical to horizontal ratio against the design data displayed on a display, by making any of the vertical to horizontal ratio of the design data 801 or the electron microscope image 802 coincident to the other. In this case, in consideration of an electron microscope, display by the ratio used in execution of the imaging is desirable, and in the case of comparison with the design data, display by the ratio as designed is desirable. In addition, there is a case where comparison by both is desired. However, this has a defect of easily providing an operator a physically wrong shape, because both are different in display methods. In addition, also, in a system for checking the design data, because an operator often understands a shape based on the design data with a correct vertical to horizontal ratio, there is a defect that an operator easily misunderstands a shape. This problem can be solved by displaying in the display 803, by pixel transformation processing, in image processing manner, of the vertical to horizontal ratio of the design data 801, so as to be transformed to the vertical to horizontal ratio of the electron microscope image 802, as shown by 804, or by pixel transformation processing, in image processing manner, of the vertical to horizontal ratio of the electron microscope image 802, so as to be transformed to the vertical to horizontal ratio of the design data 801, as shown by 805. In addition, similar effect can also be obtained by displaying one of the 804 or 805, or both thereof at the same time, on the display 803.

Figure 9A:
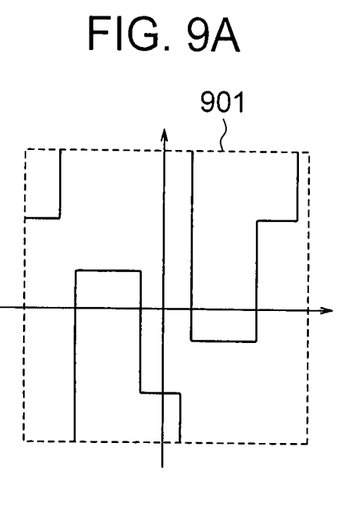
FIGS. 9A, 9B and 9C are drawings which show a method for displaying the design data and an electron microscope image on a display, according to one embodiment of the invention.
Figure 9B:
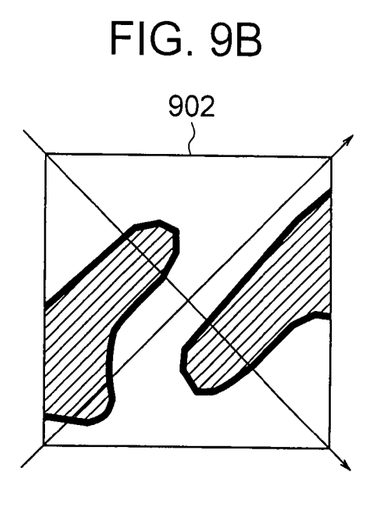
Figure 9C:
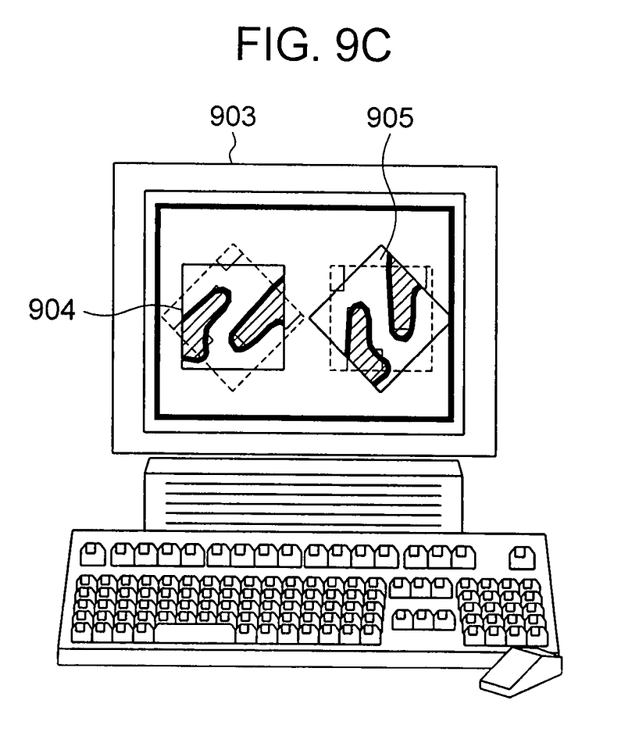

FIGS. 9A and 9B are drawings which show a method for displaying on the display 903, according to one embodiment of the invention, in the case of executing pattern matching by imaging a rotated image against a physical direction, or a rotated image against the design data displayed on a display. It is possible to execute a pattern matching method for the rotated image against a physical direction, or the rotated image against the design data displayed on a display, by making any of the design data 901 or the electron microscope image 902 coincident to the other by rotation.

In this case, in consideration of an electron microscope, display in the rotation direction used in execution of the imaging is desirable, and in the case of comparison with the design data, display by the rotation direction as designed is desirable. In addition, there is a case where comparison by both is desired. However, this has a defect of easily providing an operator a physically wrong shape, because both are different in display methods. In addition, also, in a system for checking the design data, because an operator often understands a shape based on a direction of the design data, there is a defect that an operator easily misunderstands a shape. This problem can be solved by displaying in the display 903, by pixel transformation processing, in image processing manner, of the rotation direction of the design data 901, so as to be transformed to the rotation direction of the electron microscope image 902, as shown by 904, or by pixel transformation processing, in image processing manner, of the rotation direction of the electron microscope image 902, so as to be transformed to the rotation direction of the design data 901, as shown by 905. In addition, similar effect can also be obtained by displaying one of the 904 or 905, or both thereof at the same time, in the display 903.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pattern matching method for matching between a design data-based first image of an object sample, and a second image, comprising steps of: determining whether or not a periodic structure is included in a region to be subjected to the matching of said first image and second image;
   selecting a pattern, based on a distance between an original point which is set in said images, and pattern configuring said periodic structure, in the case where the periodic structure is included in said region; and
   selecting a pattern based on coincidence of the pattern in said images, in the case where the periodic structure is not included in said region.

2. The pattern matching method according to claim 1, wherein the determining step determines whether or not said periodic structure is included in said region to be subjected to said matching in said design data based first image.

3. The pattern matching method according to claim 1, wherein, in the case where the periodic structure is included in said region, a pattern configuring said periodic structure which is nearest from the image center is selected.

4. The pattern matching method according to claim 1, wherein, in the case where the periodic structure is not included in said region, a pattern which exhibits the highest coincidence in said images is selected.

5. The pattern matching method according to claim 1, wherein the dimension of the pattern of said second image selected is measured.

6. The pattern matching method according to claim 1, wherein said determining step is carried out in the case where a plurality of drawings are included in said images.

7. The pattern matching method according to claim 1, wherein the shape of a plurality of drawings in said region is determined, and in the case where a plurality of drawings, which are determined to be the same, are included in said region, it is determined that the periodic structure is included in said region.

8. A non-transitory computer-readable recording medium carrying a program, wherein execution of the program causes a computer to perform matching between a design data-based first image of an objective sample and a second image, wherein the matching including functions comprising:
   determining whether or not a periodic structure is included in a region to be subjected to the matching of said first image and second image
   selecting a pattern, based on a distance between an original point which is set in said images; and pattern configuring said periodic structure, in the case where the periodic structure is included in said region; and
   selecting a pattern based on coincidence of the pattern in said image, in the case where the periodic structure is not included in said region.

9. The computer readable recording medium according to claim 8, wherein in said determination, the determining step determines whether or not said periodic structure is included in said region to be subjected to said matching in said design data based first image.

10. The computer readable recording medium according to claim 8, wherein, in the case where the periodic structure is included in said region, a pattern configuring said periodic structure which is nearest from the image center is selected.

11. The computer readable recording medium according to claim 8, wherein, in the case where the periodic structure is not included in said region, a pattern which exhibits the highest coincidence in said images is selected.

12. The computer readable recording medium according to claim 8, wherein the dimension of the pattern of said second image selected is measured.

13. The computer readable recording medium according to claim 8, wherein said determining step is carried out in the case where a plurality of drawings are included in said images.

14. The program product according to claim 8, wherein the shape of a plurality of drawings in said region is determined, and in the case where a plurality of drawings, which are determined to be the same, are included in said region, it is determined that the periodic structure is included in said region.

15. A scanning electron microscope equipped with a computer which executes matching between a design data-based first image of an object sample, and a second image obtainable by scanning electron beams,
wherein said computer:
determine whether or not a periodic structure is included in a region to be subjected to the matching of said first image and second image is determined,
selects a pattern, based on distance between an original point which is set in said image, and pattern configures said periodic structure, in the case where the periodic structure is included in said region, and
selects a pattern based on coincidence of the pattern in said images, in the case where the periodic structure is not included in said region.

* * * * *